No. 618,834. Patented Feb. 7, 1899.
W. W. BISHOP.
COMPUTING DEVICE FOR SCALES.
(Application filed May 19, 1897.)
(No Model.)
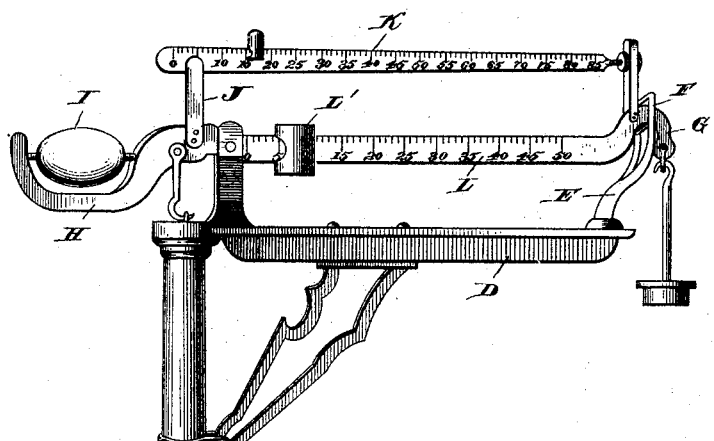
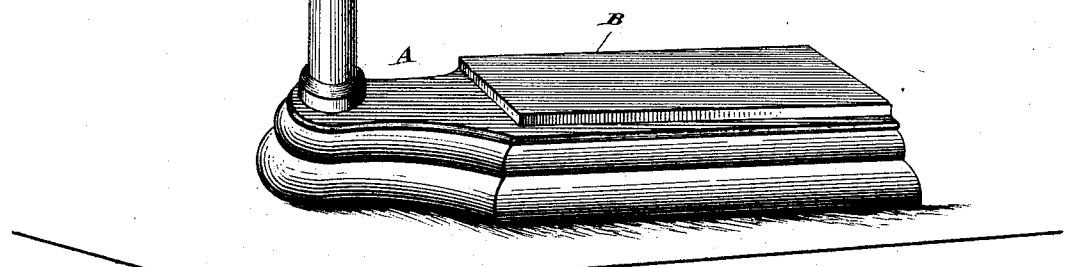
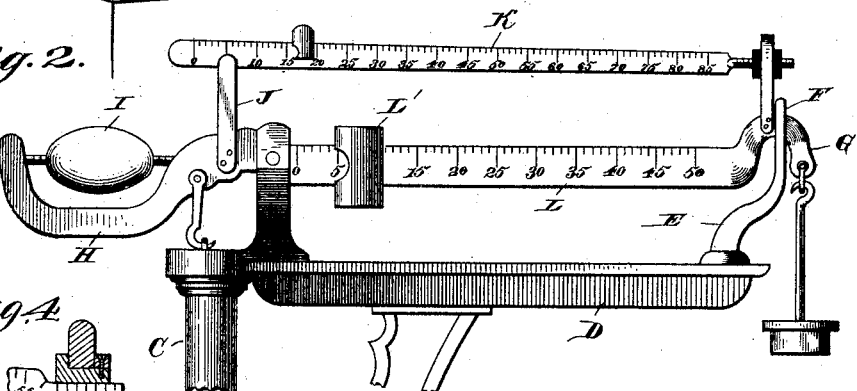
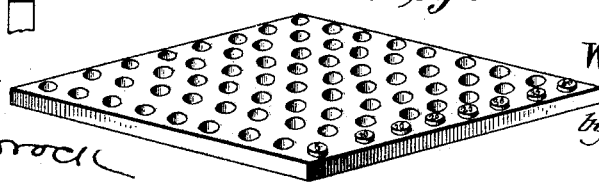
Inventor
William W. Bishop,

UNITED STATES PATENT OFFICE.

WILLIAM W. BISHOP, OF MOUNT VERNON, INDIANA.

COMPUTING DEVICE FOR SCALES.

SPECIFICATION forming part of Letters Patent No. 618,834, dated February 7, 1899.

Application filed May 19, 1897. Serial No. 637,289. (No model.)

*To all whom it may concern:*

Be it known that I, WILLIAM W. BISHOP, residing at Mount Vernon, in the county of Posey and State of Indiana, have invented a new and useful Computing Device for Scales, of which the following is a specification.

This invention has relation to certain improvements in scales, and more particularly to a device attached thereto whereby the price per pound or unit of measure of the article to be purchased, the weight of the article, and the total price of the article will be indicated.

An object of the invention is to provide a scale carrying the ordinary weighing mechanism, also a scale-bar adapted to receive certain figures to indicate the amount of the purchase, and an indicator representing the amount or price per pound or unit of the article being purchased.

A further object of the invention is to provide a board or block having suitable openings formed therein to receive certain weights or blocks carrying the numerals on the upper face thereof to indicate the price of the article being purchased, the same being adapted to be placed upon the computing-bar at the upper portion of the scale.

With these and other objects in view my invention consists in certain novel features of construction and in combinations and arrangements of parts, as will be more fully described hereinafter and specifically pointed out in the claim.

In order that my invention may be fully understood, I will proceed to describe the same with reference to the accompanying drawings, in which—

Figure 1 is a perspective view showing a scale constructed in the usual manner and provided with my improved computing device. Fig. 2 is a side elevation, and Fig. 3 is a perspective view, of the board or block provided with the openings for the reception of the different numbered and sized weights. Fig. 4 is an enlarged view of the graduated bar, the end being shown partly in section.

The same letters of reference will indicate like parts wherever they occur throughout the different views.

In carrying out my invention I have shown an ordinary scale A, the same being provided with the usual platform B.

C represents an upwardly-extended bar having the forwardly-projecting part D, the same being provided with the upwardly-extending arm E, said arm being arranged in the usual manner and provided with the central slot or opening F for the reception of the arm portions G of the bar carrying the graduated scale.

H represents the bracket in the rear part of the scale, carrying the weighted portion or ball I, so that the scale portion thereof can be held in a true position or adjusted, as usual.

Pivotally secured to the rear and front portions of the scale-bar are the upwardly-extending arms J, the same being connected, substantially as described, to the upper bar or computing-scale K, this scale having the numerals thereon, as clearly shown in the drawings. It should be noted that this computing scale or bar is provided with a series of numerals running from "5" to "85," respectively, although any number of such numerals can be employed as occasion may demand. This bar is adapted to receive, as before stated, the different sized and numbered weights arranged or located in the opening of the board or block, as seen in Fig. 3.

The numbered weights or blocks located in the openings of the board are supposed to represent the price per pound or unit of the article to be purchased, while the numerals on the computing-scale are intended to represent the total price of merchandise desired.

The following may be given as an example of the operation of my device: Supposing that the merchandise is worth ten cents a pound and the customer desires to expend thirty-five cents for such merchandise, in this case the weight numbered "10" will be removed from the board and placed upon the computing-bar at the figure or numeral "35," thereby showing that merchandise to the amount of thirty-five cents is desired at ten cents per pound. It is of course understood that the merchandise is placed upon the platform and weighed in the usual manner, an ordinary scale bar or rod L being employed, as usual.

From the foregoing description it will be seen that I provide a computing attachment for a scale whereby the merchant is provided with a convenient device to indicate the quantity of merchandise ordered by the customer and also is provided with an indicator showing exactly the price of the merchandise being purchased.

The device is very simple in construction and composed of but a few parts, and by reason of the peculiar construction thereof I am enabled to produce a scale having the regular weighing mechanism and at the same time provide a computing mechanism showing exactly the amount to be charged for the goods being purchased, as well as the quantity desired by the customer.

Various slight changes might be made in the forms and constructions of the several parts described without departing from the spirit and scope of my invention. Hence I do not care to limit myself to the exact construction herein set forth.

Having thus described my invention, what I claim as new, and desire to secure by Letters Patent, is—

In a scale, the combination with the graduated bar or tare-beam, of arms attached to and projecting above said beam adjacent to the respective ends thereof, one of said arms having its upper end grooved and the other formed with an opening, a supplementary graduated bar seated in the groove of said arm and having a threaded end, and a nut swiveled in the opening of said arm and receiving the threaded end of the supplementary graduated bar, whereby said graduated bar may be attached to and adjusted on or removed from a tare-beam of any ordinary scale, substantially as described.

WILLIAM W. BISHOP.

Witnesses:
 EDWIN T. GREEN,
 JOHN RUMINER.